United States Patent
Jacob et al.

(10) Patent No.: US 12,499,004 B2
(45) Date of Patent: Dec. 16, 2025

(54) KUBERNETES ROOT CAUSE ANALYSIS SYSTEM

(71) Applicant: Kyndryl, Inc., New York, NY (US)

(72) Inventors: Glincy Mary Jacob, Chengannur (IN); Omar Odibat, Cedar Park, TX (US)

(73) Assignee: Kyndryl, Inc., New York, NY (US)

( * ) Notice: Subject to any disclaimer, the term of this patent is extended or adjusted under 35 U.S.C. 154(b) by 50 days.

(21) Appl. No.: 18/441,015

(22) Filed: Feb. 14, 2024

(65) Prior Publication Data

US 2025/0258734 A1    Aug. 14, 2025

(51) Int. Cl.
*G06F 11/00*    (2006.01)
*G06F 11/07*    (2006.01)

(52) U.S. Cl.
CPC ........ *G06F 11/079* (2013.01); *G06F 11/0736* (2013.01)

(58) Field of Classification Search
CPC .. G06F 11/00; G06F 11/0718; G06F 11/0706; G06F 11/079; G06F 11/0736; G06F 11/0772
See application file for complete search history.

(56) References Cited

U.S. PATENT DOCUMENTS

| | | | |
|---|---|---|---|
| 2016/0224662 A1 | 8/2016 | King et al. | |
| 2023/0034587 A1* | 2/2023 | Ranka | G06F 11/0775 |
| 2023/0105304 A1* | 4/2023 | Mandal | G06F 18/2415 |
| | | | 714/37 |
| 2024/0184659 A1* | 6/2024 | Vandeventer | G06F 8/71 |
| 2024/0370286 A1* | 11/2024 | Pandi | G06F 11/3055 |
| 2025/0112816 A1* | 4/2025 | Titon | H04L 41/064 |

FOREIGN PATENT DOCUMENTS

| | | |
|---|---|---|
| CN | 111104508 A | 5/2020 |
| CN | 113378557 A | 9/2021 |
| CN | 115795478 A | 3/2023 |

(Continued)

OTHER PUBLICATIONS

Kang et al., "A Computer-Facilitated Method for Matching Incident Cases Using Semantic Similarity Measurement", IFIP/IEEE International Symposium on Integrated Network Management—Workshops, 2009, pp. 10-19.

(Continued)

*Primary Examiner* — Jonathan D Gibson
(74) *Attorney, Agent, or Firm* — CANTOR COLBURN LLP; Erik Swanson

(57) ABSTRACT

Computer-implemented methods for a Kubernetes root cause analysis system. Aspects include receiving a keyword from a preprocessor of a Kubernetes root cause analysis system. Aspects further include determining a degree of similarity for the keyword. Aspects also include determining a membership approximation for the keyword in a labeled gravid fuzzy rough set of a multifaceted knowledge corpus based on the degree of similarity for the keyword. Aspects include receiving a determination associated with the membership approximation for the keyword from a subject matter expert. Aspects further include performing a membership action using the keyword on the labeled gravid fuzzy rough set.

20 Claims, 11 Drawing Sheets

(56) References Cited

FOREIGN PATENT DOCUMENTS

CN 116185956 A 5/2023

OTHER PUBLICATIONS

Partial International Search Report and Provisional Opinion; Mailed: Nov. 6, 2024; Application No. PCT/EP2024/063914; Filed: May 21, 2024; 10 pages.
Patrascu, "Rough Sets on Four-Valued Fuzzy Approximation Space", Fuzzy Systems Conference, 2007, 5 pages.
Anonymous, "Microservice Auto-Diagnose and Root Cause Shooting System," IP.com No. IPCOM000270833D, Aug. 26, 2022, 4 pages.

* cited by examiner

KUBERNETES ROOT CAUSE ANALYSIS SYSTEM

BACKGROUND

The present invention generally relates to computer systems, and more specifically, to computer-implemented methods, computer systems, and computer program products configured and arranged to analyze root causes of Kubernetes pod crashes in a computing environment.

Kubernetes is an open-source container orchestration system for automating software deployment, scaling, and management of containerized applications. A Kubernetes cluster includes one or more worker machines, also called nodes, which run containerized applications. The nodes host the Kubernetes pods, also referred to as pods, which are the smallest deployable units of computing that can be created and managed in Kubernetes. Pods are a group of one or more containers with shared storage and network resources and a specification for how to run the containers. A control plane of the Kubernetes system manages the worker nodes and the pods in the cluster. Each pod includes a Kubelet, which is a node-level agent that communicates with the control plane and manages pod deployment, resource management, and health monitoring of the clusters.

SUMMARY

Embodiments of the present invention are directed to computer-implemented methods for a Kubernetes root cause analysis system. A non-limiting computer-implemented method includes receiving a keyword from a preprocessor of a Kubernetes root cause analysis system. The method also includes determining a degree of similarity for the keyword. The method further includes determining a membership approximation for the keyword in a labeled gravid fuzzy rough set of a multifaceted knowledge corpus based on the degree of similarity for the keyword. The method includes receiving a determination associated with the membership approximation for the keyword from a subject matter expert. The method further includes performing a membership action using the keyword on the labeled gravid fuzzy rough set.

In one embodiment of the present invention, the membership approximation for the keyword is a probable membership approximation and the membership action is moving the keyword to a strong membership approximation of the labeled gravid fuzzy rough set, moving the keyword to a weak membership approximation of the labeled gravid fuzzy rough set, or moving the keyword to a different labeled gravid fuzzy rough set of the multifaceted knowledge corpus.

In one embodiment of the present invention, the method includes receiving a different keyword from the preprocessor of the Kubernetes root cause analysis system. The method further includes determining a degree of similarity for the different keyword. The method also includes determining a rejected membership approximation for the different keyword in the labeled gravid fuzzy rough set of the multifaceted knowledge corpus based on determining that the degree of similarity for the different keyword is below a threshold. The method also includes moving the different keyword to the rejected membership approximation in the labeled gravid fuzzy rough set.

In one embodiment of the present invention, the multifaceted knowledge corpus includes data shelves of different data types and a shelf of the multifaceted knowledge corpus includes the labeled gravid fuzzy rough set.

In one embodiment of the present invention, the method includes receiving, by the preprocessor, input data comprising logs, events, and Kubernetes pod details associated with a Kubernetes pod crash. The method further includes identifying, by the preprocessor, the keyword by preprocessing text of the input data and filtering the events of the Kubernetes pod crash.

In one embodiment of the present invention, the method includes receiving, by the Kubernetes root cause analysis system, an indication of a new Kubernetes pod crash. The method further includes preprocessing new input data associated with the new Kubernetes pod crash. The method also includes identifying a cause of the new Kubernetes pod crash by finding a matching keyword in the multifaceted knowledge corpus with a new keyword identified from preprocessing the new input data. The method further includes generating a recommendation based on a label associated with the matching keyword in the multifaceted knowledge corpus. In some embodiments, the recommendation includes a suggestion to correct an error in a Kubernetes pod that caused the new Kubernetes pod crash.

According to another non-limiting embodiment of the invention, a system having a memory having computer readable instructions and one or more processors for executing the computer readable instructions, the computer readable instructions controlling the one or more processors to perform operations. The operations include receiving a keyword from a preprocessor of a Kubernetes root cause analysis system. The operations also include determining a degree of similarity for the keyword. The operations further include determining a membership approximation for the keyword in a labeled gravid fuzzy rough set of a multifaceted knowledge corpus based on the degree of similarity for the keyword. The operations include receiving a determination associated with the membership approximation for the keyword from a subject matter expert. The operations further include performing a membership action using the keyword on the labeled gravid fuzzy rough set.

According to another non-limiting embodiment of the invention, a computer program product is provided. The computer program product includes a computer-readable storage medium having program instructions embodied therewith, the program instructions executable by a processor to cause the processor to perform operations. The operations include receiving a keyword from a preprocessor of a Kubernetes root cause analysis system. The operations also include determining a degree of similarity for the keyword. The operations further include determining a membership approximation for the keyword in a labeled gravid fuzzy rough set of a multifaceted knowledge corpus based on the degree of similarity for the keyword. The operations include receiving a determination associated with the membership approximation for the keyword from a subject matter expert. The operations further include performing a membership action using the keyword on the labeled gravid fuzzy rough set.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
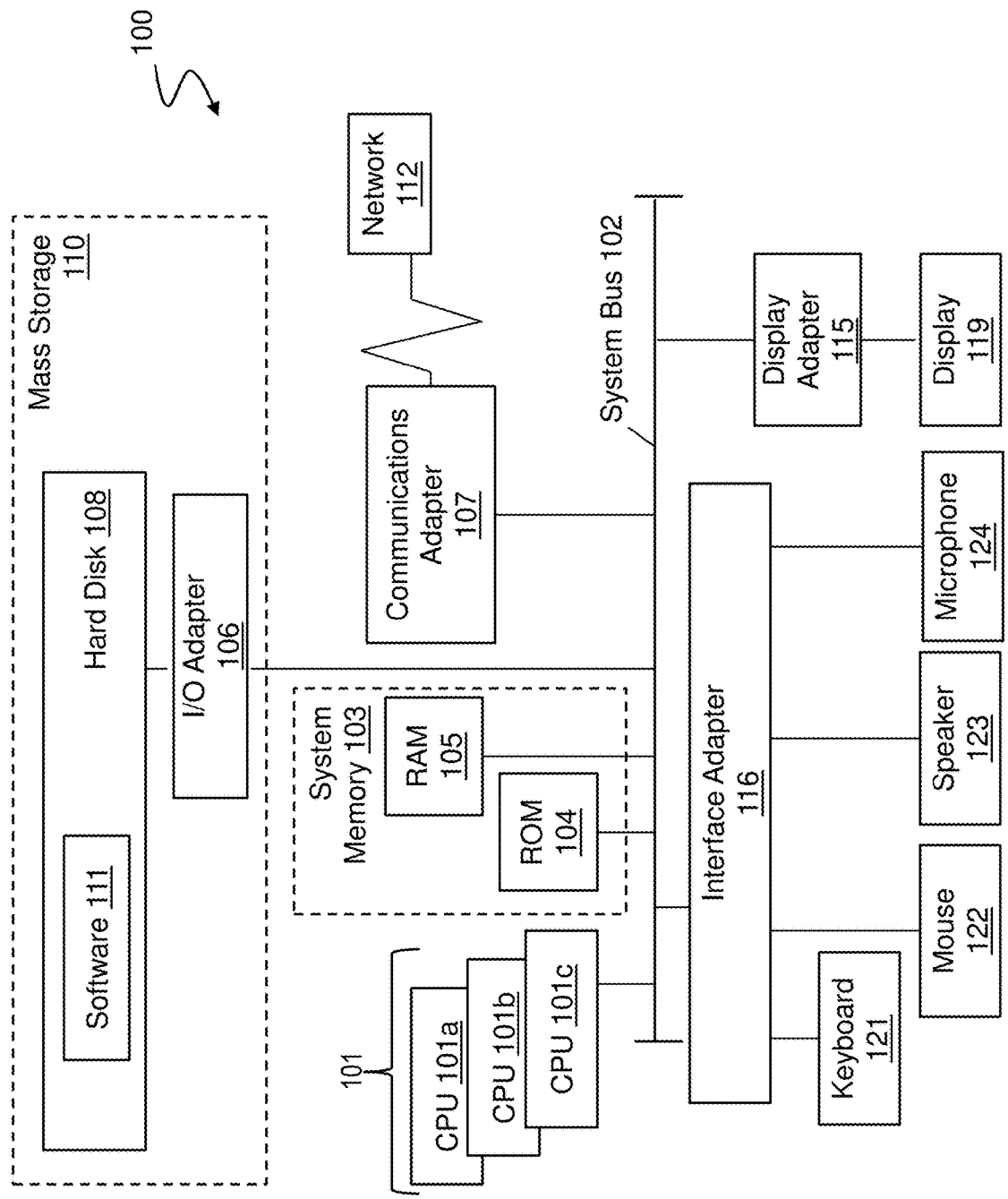
FIG. 1 depicts a block diagram of an example computer system for use in conjunction with one or more embodiments of the present invention.

Disclosed herein are methods, systems, and computer program products for analyzing root causes for Kubernetes pod crashes. Kubernetes is an open-source container orchestration system for automating software deployment, scaling, and management of containerized applications. Problems that can occur in a Kubernetes system include identifying causes of failures or errors in a Kubernetes pod. For example, pod failures or crashes can occur due to an application error, an image pull error, node unavailability due to insufficient resources or Kubelet proxy issues, a misconfigured file, or persistent volume mount issues. Identifying causes of pod failures requires in-depth knowledge of the domain, the Kubernetes system, and the application and is usually performed by a subject matter expert.

Productive root cause analysis includes analyzing the logs, the Kubernetes events, and the Kubernetes pod details generated by the Kubernetes system. The logs generated in association with Kubernetes pods are often unstructured data that are not subject to grammar rules and may include data that is specific to a developer or group of developers. Additionally, the data in the logs can also be specific to each application of the pod. Such factors can increase the time and energy required to identify the root cause of a pod failure or fault.

The systems and methods described herein create and maintain a multifaceted knowledge corpus that includes a collection of correlated features and/or attributes of different datatypes used in the root cause analysis of Kubernetes pod crashes. The multifaceted knowledge corpus is a self-building knowledge corpus that includes encapsulated predefined keywords and mappings that can be used to identify root causes of Kubernetes pod crashes.

The multifaceted knowledge corpus includes a keyword corpus that utilizes labeled gravid fuzzy rough sets of keywords to model the high degree of uncertainty of the real cause of a Kubernetes pod crash. The concepts of fuzzy set theory enable the multifaceted knowledge corpus to model vague data sets while the concepts of rough set theory enable the multifaceted knowledge corpus to model incomplete data sets. A fuzzy rough set includes the pair of lower and upper approximations of a fuzzy set in a universe on which a fuzzy relation is defined. Fuzzy rough sets are not able to model a knowledge corpus due to their inability to add new elements to the set or control the addition of new elements. The labeled gravid fuzzy rough sets, described herein and as used in the multifaceted knowledge corpus, extend the features of the fuzzy rough set by incorporating a validation element to model the uncertain memberships of new keywords.

In some embodiments, the system can identify a root cause of Kubernetes pod crash utilizing the multifaceted knowledge corpus. The system receives input data associated with a Kubernetes pod crash, such as the logs, the Kubernetes events, and the Kubernetes pod details. The input data is preprocessed and analyzed by a preprocessor to locate errors and extract meaningful insights associated with the Kubernetes pod crash. The errors are located using keyword extraction and error neighbor recognition based on a degree of similarity determined between the keywords from the input data and a keyword corpus of the multifaceted knowledge corpus. The system identifies keywords associated with the Kubernetes pod crash from the keyword corpus and identifies one or more labels associated with the labeled gravid fuzzy rough set of keywords of the keyword corpus. A recommendation builder of the system receives the one or more labels and scores and ranks the labels to identify the relevance of each label with the issue associated with the identified keywords. The recommendation builder generates a recommendation that identifies the top ranked relevant issues associated with the keywords and provides a suggestion to correct the error or issue in the Kubernetes pod that caused the new Kubernetes pod crash. In response to acceptance of the suggestion for a recommendation, the system executes the suggestion to correct the error or issue in the Kubernetes pod, thereby preventing a future Kubernetes pod crash.

In some embodiments, the system facilitates the growth of the keyword corpus of the multifaceted knowledge corpus by enabling the automated addition of new potential keywords based on fuzzy similarity measures. The new potential keyword addition is initially associated with a membership approximation for one or more labeled gravid fuzzy rough sets of keywords in the multifaceted knowledge corpus. The wisdom of the crowd or the knowledge from subject matter experts is leveraged to control the addition of new keywords to the multifaceted knowledge corpus. For example, the subject matter experts review and provide feedback for the initial membership approximation of the new potential keyword. The system incorporates the feedback in a membership action that finalizes the membership approximation for the new potential keyword for one or more labeled gravid fuzzy rough sets of the multifaceted knowledge corpus.

Although the systems and methods described herein are characterized in the context of a Kubernetes platform, the inventive steps can be applied to many different scenarios where detection of root causes of software failures requires in-depth knowledge of the system and analysis of different types of data that may be difficult to consume or are provided in large volumes.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning now to FIG. 1, a computer system 100 is generally shown in accordance with one or more embodiments of the invention. The computer system 100 can be an electronic computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, a desktop computer, a laptop computer, a tablet computer, or a smartphone. In some examples, the computer system 100 may be a cloud computing node. The computer system 100 may be described in the general context of computer system executable instructions, such as program modules, being executed by a computer system. Generally, program modules may include routines, programs, objects, components, logic, data structures, and so on that perform tasks or implement abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, a multi-core processor, a computing cluster, or any number of other configurations. The processors 101, also referred to as processing circuits, are coupled via a system bus 102 to a system memory 103 and various other components. The system memory 103 can include a read only memory (ROM) 104 and a random-access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

The software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
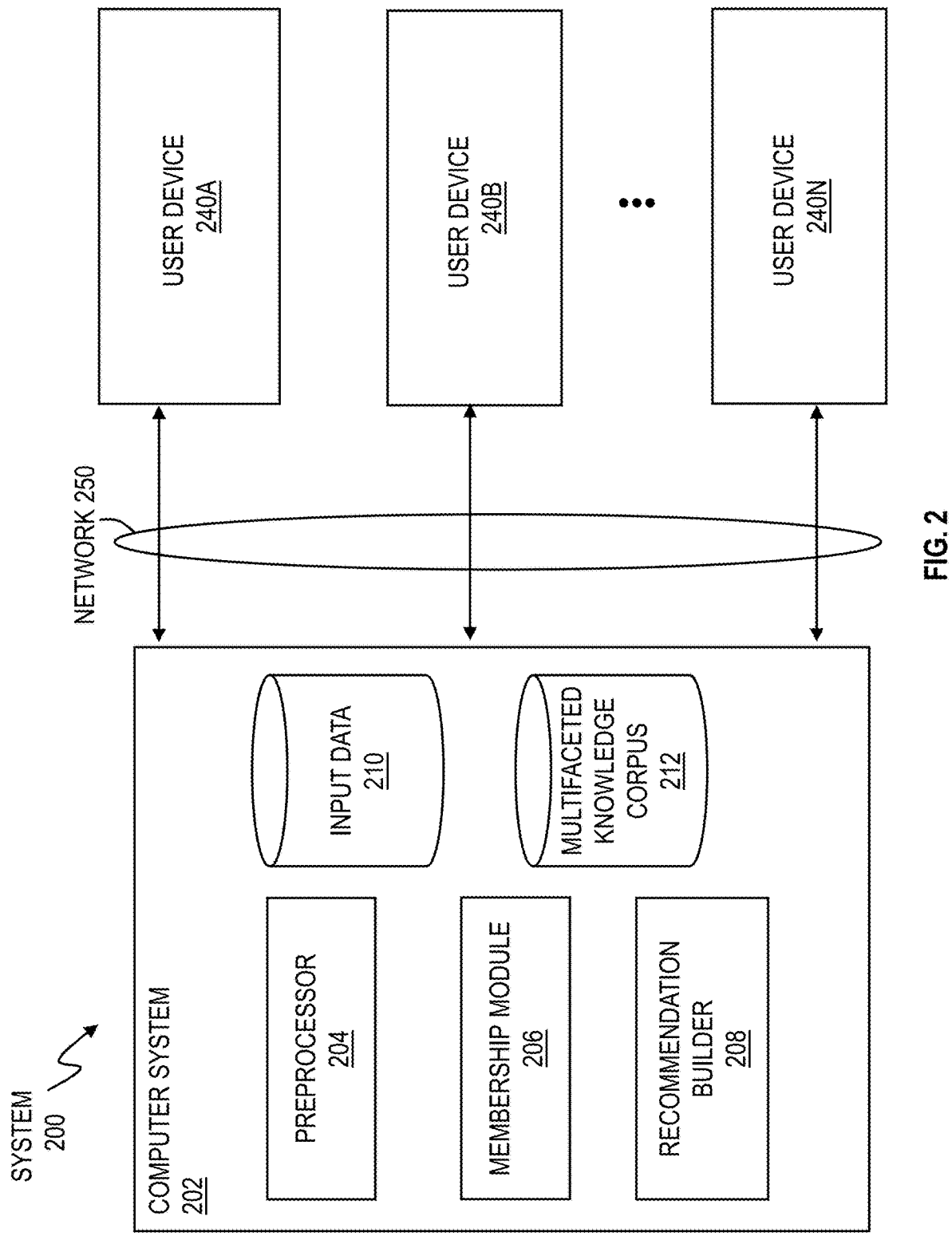
FIG. 2 depicts a block diagram of an example system for analyzing root causes of Kubernetes pod crashes in a computing environment in accordance with one or more embodiments of the present invention.

FIG. 2 depicts a block diagram of an example system 200 for analyzing root causes of Kubernetes pod crashes in a computing environment according to one or more embodiments. The system 200 includes a computer system 202 configured to communicate over a network 250 with many different user devices, such as a user device 240A, a user device 240B, through a user device 240N. The user devices 240A, 240B, through 240N can generally be referred to as user device 240 and are utilized to access the computing environment. The user device 240 can be a personal computer or laptop. The user device 240 can be a mobile device such as a cellular phone or tablet, or a smart device. A smart device is an electronic device, generally connected to other devices or networks via different wireless protocols that can operate to some extent interactively. Several notable types of smart devices are smartphones, smart speakers, tablets, smartwatches, smart bands, smart glasses, and many others.

The network 250 can be a wired and/or wireless communication network, and the communication network includes a telecommunications network, the public switched telephone network (PTSN), voice over IP (VOIP) network, etc. The communication network includes cellular networks, satellite networks, etc.

The user devices 240 can include various software and hardware components including software applications (apps) for communicating with one another over the network 250 as understood by one of ordinary skill in the art. The computer system 202, user device(s) 240, a preprocessor 204, a membership module 206, a recommendation builder 208, input data 210, and a multifaceted knowledge corpus 212, etc., can include functionality and features of the computer system 100 in FIG. 1, including various hardware components and various software applications, such as the software 111, which can be executed as instructions on one or more processors 101 in order to perform actions according to one or more embodiments of the invention. The preprocessor 204, the membership module 206, the recommendation builder 208, the input data 210, and the multifaceted knowledge corpus 212 can include, be integrated with, and/or call other pieces of software, algorithms, application programming interfaces (APIs), etc., to operate as discussed herein.

The computer system 202 may be representative of numerous computer systems and/or distributed computer systems configured to utilize Kubernetes and provide access to the Kubernetes system to one or more user devices 240. The computer system 202 can be part of a cloud computing environment such as a cloud computing environment 50 depicted in FIG. 10, as discussed further herein.

In some embodiments, the computer system 202 can include one or more components to analyze root causes of Kubernetes pod crashes in a computing environment. For example, the computer system 202 can include a preprocessor 204, a membership module 206, a recommendation builder 208, input data 210, and a multifaceted knowledge corpus 212.

In some embodiments, the preprocessor 204 of the computer system 202 receives input data 210 associated with a Kubernetes pod crash. Input data 210 includes, but is not limited to, pod details, events, and logs associated with a Kubernetes pod. Pod details can include data indicating the status of the pod. Pod details can include the state of each container in the pod. Containers can have or be associated with many different possible states. In example embodiment, containers can have three possible states-Running, Waiting, or Terminated. The information can include a reason, an exit code, and the start and finish time for the period of execution for the container.

Kubernetes events, also known as events, are objects that are used to monitor applications and cluster state, respond to failures, and perform diagnostics. Events are generated when there is a state change in one or more resources of the cluster, such as pods, deployments, or nodes. Events do not typically persist for more than a short period of time. Examples of causes that trigger generation of events include state changes, configuration changes, and scheduling issues. State changes can include creation of a Kubernetes pod, and changes in pod status to pending, successful, or failed. Configuration changes that can trigger generation of events can include scaling horizontally by adding replicas or scaling vertically by upgrading memory, disk input/output capacity, and/or processor cores. Failed scheduling can generate events. Failures in scheduling can include, but are not limited to, failures due to insufficient resources, invalid container image repository access, or a container fails a liveness or readiness probe.

There are different types of Kubernetes events. Failed events typically refer to issues creating a container, such as being unable to pull the container image from the repository. Eviction events occur when a node determines that the Kubernetes pods need to be evicted or terminated to free up resources, such as CPU, memory, or disk space. Failed scheduling events occur when the scheduler is unable to find a sufficient node for the Kubernetes pod. FailedMount and FailedAttach Volume are common events caused by a networking or configuration error between the persistent volume and persistent volume claims, which prevents disks from being used by the pods. A persistent volume is a piece of storage in the Kubernetes cluster. A persistent volume claim is a request for storage. A FailedAttach Volume event can occur when a volume cannot be detached from a previous node to be mounted on the current node. A FailedMount event can occur when a volume cannot be mounted on the required path. Another type of event is related to the Kubernetes nodes, such as the Rebooted event (i.e., node rebooted), NodeNotReady event (i.e., node is in preparation mode and not ready to be scheduled for pods), and HostPortConflict (i.e., cluster is unreachable or is unable to connect).

The logs of the input data 210 can provide an overview of cluster performance, health of worker nodes, and performance of containers in the cluster. The information captured in the logs can be unstructured, dense, voluminous, and difficult to read without in-depth knowledge of the system.

In some embodiments, the input data 210 is received from one or more user devices 240, also known as worker machines or nodes in a Kubernetes system. The input data 210 is collected and transmitted to the computer system 202 upon detection of a Kubernetes pod crash. In some embodiments, the input data 210 is processed by the preprocessor 204 upon receipt by the computer system 202. In some embodiments, the input data 210 is collected and the preprocessor 204 processes any input data 210 collected or received within an identified window of time or at predetermined intervals of time (e.g., daily, weekly, monthly, etc.). In some embodiments, the preprocessor 204 processes the input data 210 in response to a request submitted by a user of the computer system 202.

The preprocessor 204 receives and preprocesses the input data 210. In some embodiments, the preprocessor 204 cleans, integrates, and/or transforms the data from the input data 210 to prepare the data for analysis. The preprocessor 204 applies one or more known techniques for data cleaning, such as stemming, lemmatization, punctuation removal, Uniform Resource Locator (URL) removal, and the like, to the text of the data. The preprocessor 204 can integrate the different types of data (e.g., logs, pod details, events, etc.) from the input data 210 to create a unified dataset for analysis. In some embodiments, the preprocessor 204 can transform the data by converting the data into a suitable format for analysis.

The preprocessor 204 locates errors in the preprocessed data using one or more techniques for keyword extraction and error neighbor recognition. The keyword extraction is performed using the degree of similarity between the extracted keywords and one or more labeled gravid fuzzy rough sets of the multifaceted knowledge corpus 212.

The multifaceted knowledge corpus 212 is a centralized collection of correlated features of different datatypes used in the root cause analysis of root causes of a Kubernetes pod crash. As will be further discussed in relation to FIG. 4, the multifaceted knowledge corpus 212 contains multiple shelves that can hold structures of different data types where features in one shelf are related to features of another shelf through mappings or relationships. The multifaceted knowledge corpus 212 includes automated labeling of new keyword additions to the multifaceted knowledge corpus 212 and incorporating feedback from one or more subject matter experts regarding the addition of new keywords to the multifaceted knowledge corpus 212.

In some embodiments, the membership module 206 receives a keyword from the preprocessor 204 and determines that the keyword does not exist in the multifaceted knowledge corpus 212. As will be further discussed in relation to FIG. 6, the membership module 206 utilizes techniques from fuzzy set theory to determine a membership approximation of the keyword for one or more labeled gravid fuzzy rough sets of keywords in the multifaceted knowledge corpus 212. The membership module 206 also receives feedback from one or more subject matter experts to determine a final membership approximation for the keyword in relation to the multifaceted knowledge corpus 212.

In some embodiments, the recommendation builder 208 receives one or more labels associated with an identified keyword from the multifaceted knowledge corpus 212. The recommendation builder 208 can score the identified labels and rank the labels by relevance to the identified issue. The recommendation builder 208 generates one or more recommendations to address the one or more errors that caused the Kubernetes pod failure.

Figure 3:
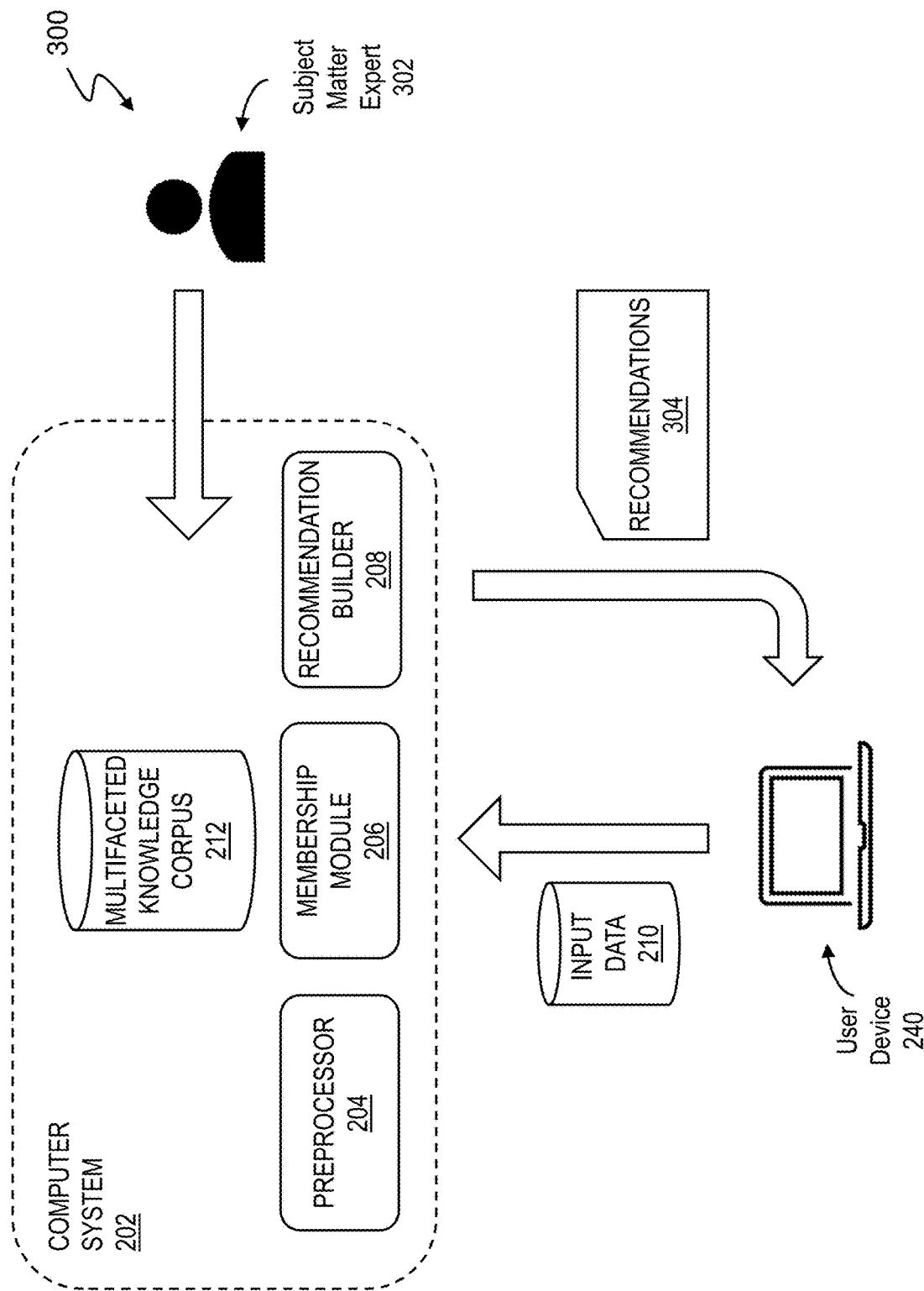
FIG. 3 is a data flow diagram for identifying root causes of Kubernetes pod crashes in a computing environment in accordance with one or more embodiments of the present invention.

Now referring to FIG. 3, a data flow diagram 300 for identifying root causes of Kubernetes pod crashes in a computing environment is depicted. The user device 240, also known as a worker machine or a node in the Kubernetes system, transmits input data 210 to the computer system 202. The input data 210 can include pod details, logs, and/or events associated with a Kubernetes pod crash. The computer system 202 receives and stores the input data 210. In some embodiments, the input data 210 is stored for a predetermined time period. In some embodiments, the input data 210 is stored until keywords extracted from the input data 210 are used to determine a root cause of the associated Kubernetes pod crash and/or the membership approximations of the keywords in relation to the multifaceted knowledge corpus 212 are determined.

The preprocessor 204 receives and preprocesses the text of the input data 210. The preprocessor 204 can apply one or more pre-processing techniques to the input data 210, such as stemming, lemmatization, punctuation removal, URL removal, and the like. The preprocessor 204 can filter events of the input data 210 based on the type of event and associated reasons provided in the event. The preprocessor 204 can locate errors in the preprocessed data using one or more techniques for keyword extraction and error neighbor recognition. The keyword extraction is performed using the degree of similarity between the extracted keywords and one or more labeled gravid fuzzy rough sets of the multifaceted knowledge corpus 212. In response to determining that there is a match between a keyword extracted by the In some embodiments, the preprocessor 204 uses the multifaceted knowledge corpus 212 to identify a matching keyword. In response to finding a matching keyword in the multifaceted knowledge corpus 212, the preprocessor 204 transmits one or more labels associated with the matching keyword from the multifaceted knowledge corpus 212 to the recommendation builder 208. The recommendation builder 208 can score the identified labels received from the preprocessor 204 and rank the labels by relevance to the identified error or issue. The recommendation builder 208 generates one or more recommendations 304 to address the one or more errors that caused the Kubernetes pod failure.

Figure 4:
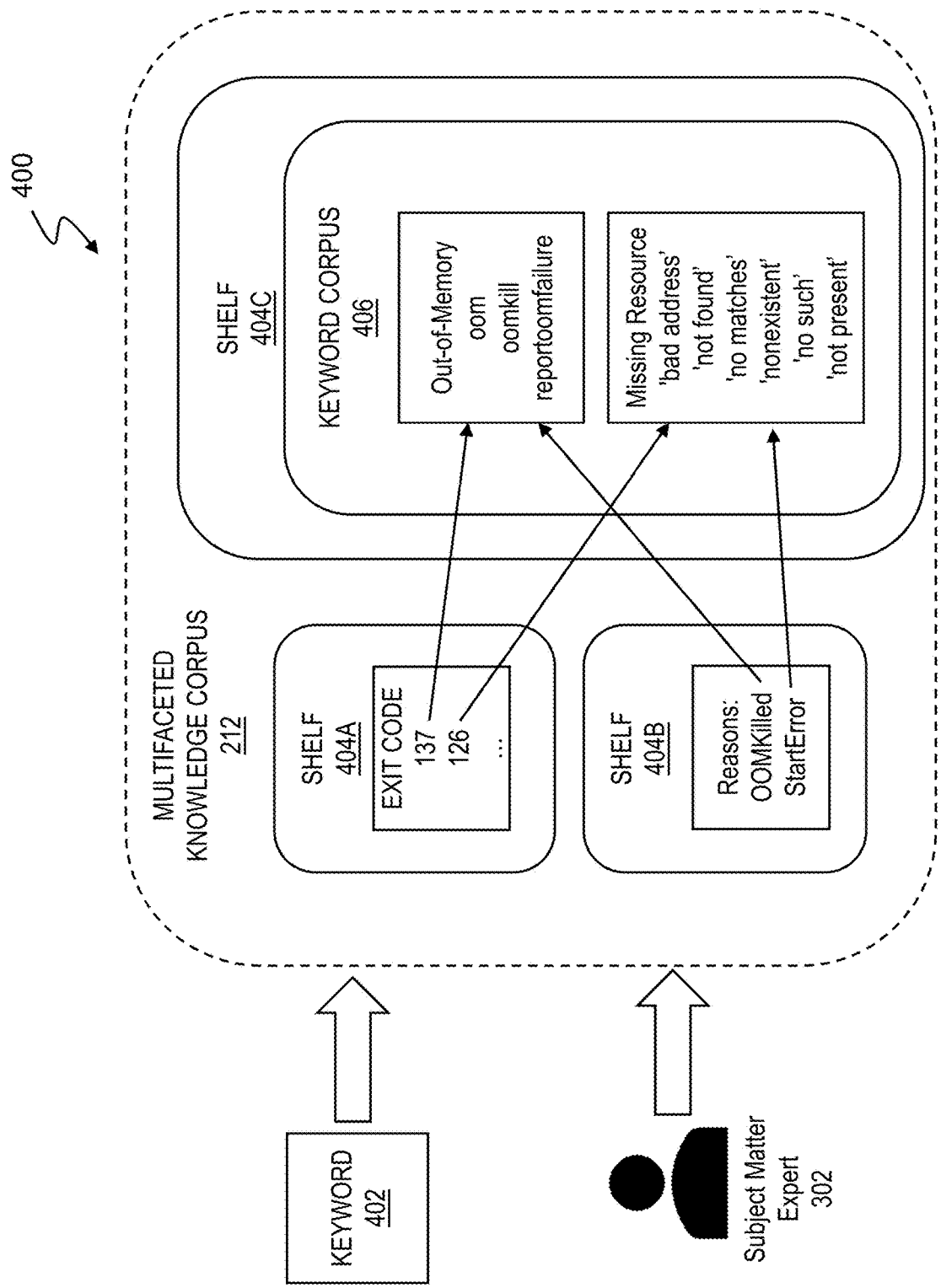
FIG. 4 is a data flow diagram for adding a new keyword to a multifaceted knowledge corpus of a system for analyzing root causes of Kubernetes pod crashes in a computing environment in accordance with one or more embodiments of the present invention.

FIG. 4 is a data flow diagram 400 depicting adding a new keyword 402 to a multifaceted knowledge corpus 212 of a system for analyzing root causes of Kubernetes pod crashes in a computing environment. As discussed herein, the multifaceted knowledge corpus 212 is a self-building centralized collection of correlated features of different data types used in the root cause analysis of Kubernetes pod crashes. The process of adding a new keyword 402 to the multifaceted knowledge corpus 212 includes automated labeling of new keywords 402 that are added to a keyword corpus 406 of the multifaceted knowledge corpus 212 and incorporation of feedback from subject matter experts 302 in determining whether to add the new keyword 402 to the keyword corpus 406.

As shown in FIG. 4, the multifaceted knowledge corpus 212 can include multiple shelves 404A, 404B, 404C that can generally be referred to as a shelf or shelves 404. The shelves 404 of the multifaceted knowledge corpus 212 are able to hold structures of different data types. In the example depicted in FIG. 4, the exit code attributes of a pod are placed in shelf 404A, and the reasons attributes of the pod are placed in shelf 404B. The shelf 404C holds a prebuilt keyword corpus 406 of errors that have been previously extracted from input data 210 of earlier Kubernetes pod crashes and associated with different groupings structures, such as labeled gravid fuzzy rough sets.

In some embodiments, the attributes or features in a shelf 404 are associated with attributes or features of another shelf 404 using relationships or mappings, depicted by the arrows between the shelves 404 in FIG. 4. In some embodiments, there are different types of relationships or mappings between the shelves 404. For example, the relationship between shelves can be an "is" relationship, which indicates the relationship between a feature of shelves 404 can be one of many possible relationships or mappings between the shelves 404. Another type of relationship or mapping between shelves 404 is the "overrides" relationship, which indicates that the relationship or mapping is the only possible mapping and overrides all other labels and/or mappings.

In some embodiments, a new keyword 402 is received from the preprocessor 204 that preprocessed input data 210 associated with a Kubernetes pod crash and extracted the new keyword 402 from the preprocessed input data 210. The membership module 206 of the computer system 202 receives the new keyword 402 and determines a membership approximation for the new keyword 402 to the keyword corpus 406. In some embodiments, the membership module 206 determines or calculates a degree of similarity for the new keyword 402 using any known fuzzy similarity measure or fuzzy matching measure and compares the degree of similarity for the new keyword 402 to a threshold associated with the keyword corpus 406. The membership module 206 associates the new keyword 402 with an initial membership approximation for the keyword corpus 406. The membership module 206 receives feedback from one or more subject matter experts 302 and makes a final membership approximation determination for the new keyword 402 in relation to the keyword corpus 406.

Figure 5:
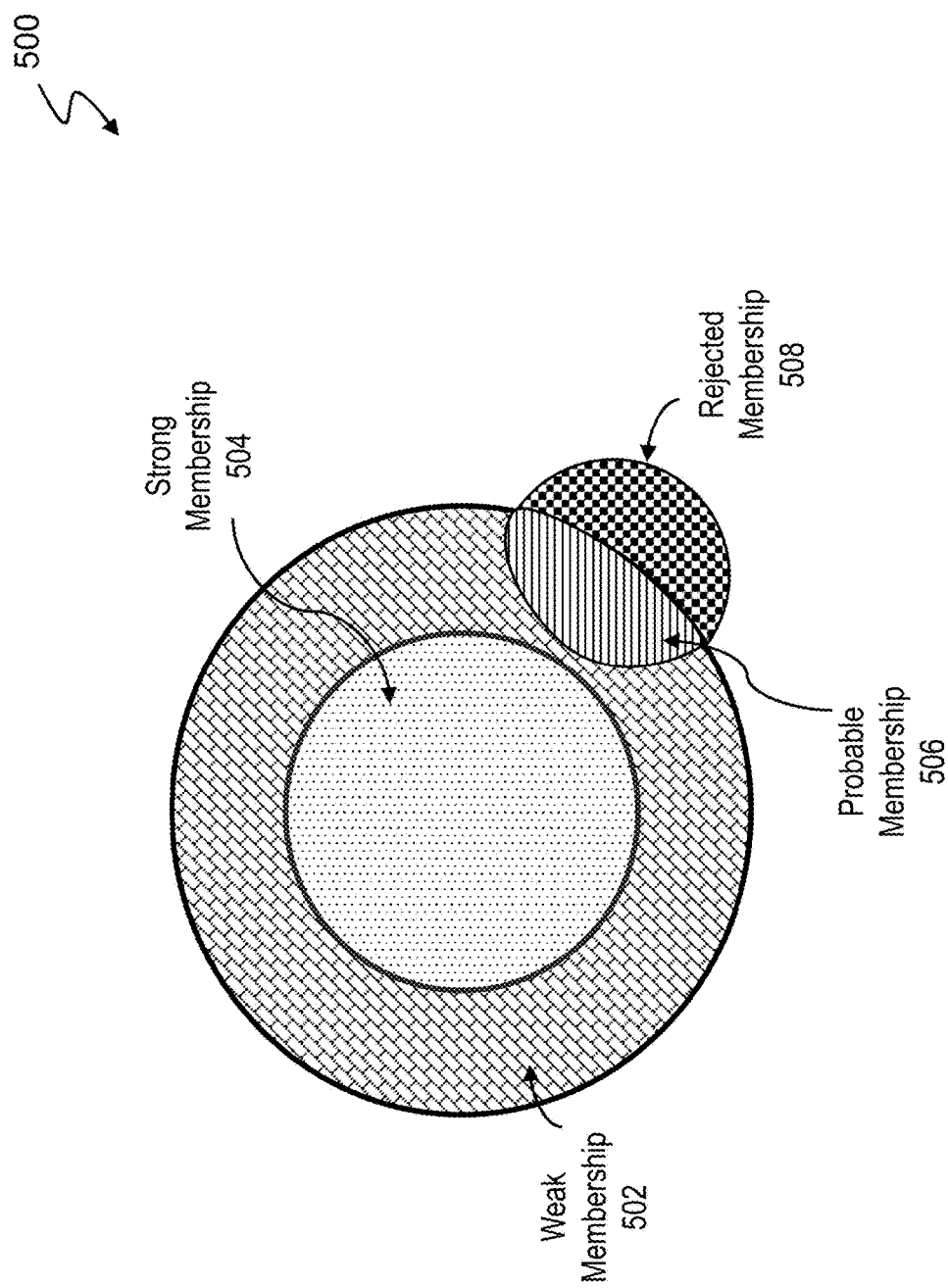
FIG. 5 is a diagram of an example labeled gravid fuzzy rough set of a multifaceted knowledge corpus of a system for analyzing root causes of Kubernetes pod crashes in a computing environment in accordance with one or more embodiments of the present invention.

FIG. 5 is a diagram of an example labeled gravid fuzzy rough set 500 of a multifaceted knowledge corpus 212 of a system for analyzing root causes of Kubernetes pod crashes in a computing environment. As discussed in FIG. 4, the multifaceted knowledge corpus 212 includes multiple shelves 404 that can hold different entities or data types. A shelf 404 of the multifaceted knowledge corpus 212 includes a keyword corpus 406 which can include one or more labeled gravid fuzzy rough sets 500 of keywords associated with root causes of Kubernetes pod crashes or failures. The keywords in a labeled gravid fuzzy rough set 500 may or may not be similar to each other but are associated with the same label of the labeled gravid fuzzy rough set 500. The labeled gravid fuzzy rough set 500 has characteristics of a fuzzy rough set but also includes additional features that enable addition of new elements and the ability to control the addition of the new elements.

As depicted in FIG. 5, the labeled gravid fuzzy rough set 500 includes four membership approximations for a fuzzy rough set A of a given universe X and a fuzzy relation R in X. The lower approximation (R↓A) denotes a strong membership approximation 504 where keywords that have been identified to certainly belong to the label of the of the labeled gravid fuzzy rough set 500. The upper approximation (R↑A) denotes a weak membership approximation 502 where the keywords have been identified to possibly belong to the label of the labeled gravid fuzzy rough set 500. The attached inner approximation (R?A) denotes a probable membership approximation 506 where the keywords are not present in the labeled gravid fuzzy rough set 500 but are identified as having a strong similarity with the keywords in the labeled gravid fuzzy rough set 500. Keywords that are determined to be part of the probable membership approximation 506 are associated with a strong probability they belong to the label of the labeled gravid fuzzy rough set 500 but require additional review by a subject matter expert 302 to finalize its inclusion in the labeled gravid fuzzy rough set 500. The attached outer approximation (RØA) denotes rejected membership approximation 508 and keeps track of the keywords that were rejected from the probable membership approximation 506 and will no longer have a membership in the labeled gravid fuzzy rough set 500.

The labeled gravid fuzzy rough set 500 is able to handle multiple memberships and unknown memberships of a new keyword 402. The same keyword 402 can have multiple memberships in different labeled gravid fuzzy rough sets 500. These keywords 402 belong to A∩B of the labeled gravid fuzzy rough sets A and B.

The labeled gravid fuzzy rough sets 500 of the multifaceted knowledge corpus 212 are capable of adding new elements (e.g., keywords) and enabling membership correction, such as in response to receiving feedback from subject matter experts 302. Thus, a labeled gravid fuzzy rough set 500 enables the multifaceted knowledge corpus 212 to be a self-building knowledge base capable of storing different data types and mappings between the data sets, which eliminate having to manually label and add keywords 402 to a keyword corpus 406.

Figure 6:
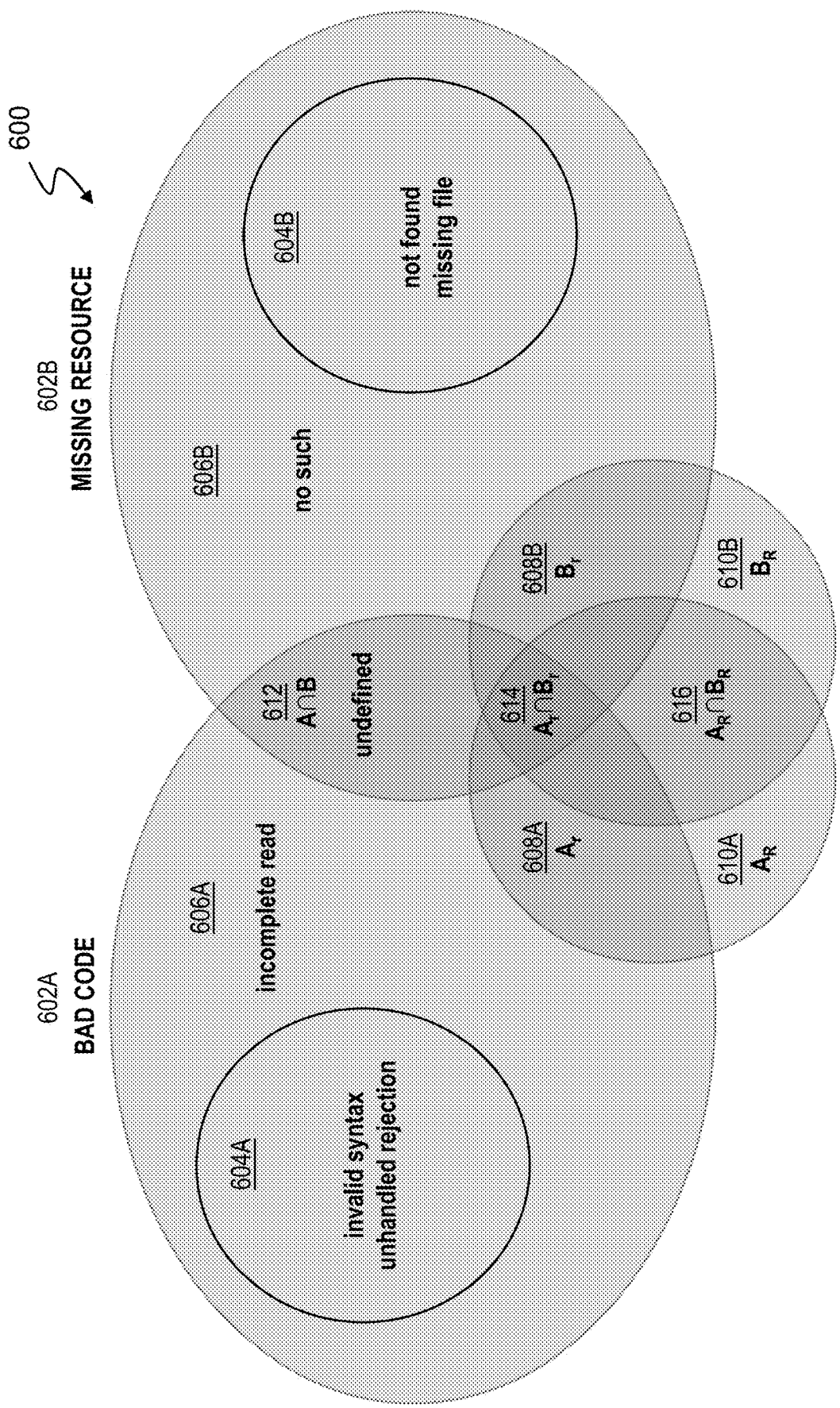
FIG. 6 is a diagram of how a membership of a new keyword is determined for a labeled gravid fuzzy rough set in a multifaceted knowledge corpus of a system for analyzing root causes of Kubernetes pod crashes in a computing environment in accordance with one or more embodiments of the present invention.

FIG. 6 is a diagram of multiple membership determination 600 of a new keyword 402 in a multifaceted knowledge corpus 212 of a system for analyzing root causes of Kubernetes pod crashes in a computing environment. In some embodiments, the labeled fuzzy gravid rough sets 602A and 602B are able to handle multiple memberships and unknown memberships of a new keyword 402. The same new keyword 402 can have multiple memberships in different labeled gravid fuzzy rough sets, such as 602A and 602B. In some embodiments, the membership module 206 determines membership of new keywords 402 using fuzzy matching measures.

FIG. 6 displays two labeled gravid fuzzy rough sets 602A and 602B that are part of the keyword corpus 406 of the multifaceted knowledge corpus 212. The labeled gravid fuzzy rough set 602A is tagged with the label "Bad Code" and the labeled gravid fuzzy rough set 602B is tagged with the label "Missing Resource." The labeled gravid fuzzy rough sets 602A and 602B include the four membership approximations, as discussed in FIG. 5. For example, the labeled gravid fuzzy rough set 602A includes a strong membership approximation 604A ($R{\downarrow}A$), a weak membership approximation 606A ($R{\uparrow}A$), a probable membership approximation 608A ($R{\uparrow}A_r$), and a rejected membership approximation 610A ($R{\uparrow}A_R$). In FIG. 6, the keywords "invalid syntax" and "unhandled rejection" belong to the strong membership approximation 604A of the labeled gravid fuzzy rough set 602A, and the keyword "incomplete read" belongs to the weak membership approximation 606A. Similarly, the labeled gravid fuzzy rough set 602B includes a strong membership approximation 604B ($R{\downarrow}B$), a weak membership approximation 606B ($R{\uparrow}B$), a probable membership approximation 608B ($R{\uparrow}B_r$), and a rejected membership approximation 610B ($R{\uparrow}B_R$). The keywords "not found" and "missing file" belong to the strong membership approximation 604B of the labeled gravid fuzzy rough set 602B and the keyword "no such" belongs to the weak membership approximation 606B.

In some embodiments, keywords can belong to multiple membership approximations in different labeled gravid fuzzy rough sets. Such keywords are shown to belong to the intersection 612 of the labeled gravid fuzzy rough set 602A and labeled gravid fuzzy rough set 602B ($A \cap B$, where A is the labeled gravid fuzzy rough set 602A and B is the labeled gravid fuzzy rough set 602B). The keyword "undefined" belongs to the intersection of the labeled gravid fuzzy rough sets 602A and 602B. Similarly, some new keywords 402 can belong to multiple labeled gravid fuzzy rough sets 602A and 602B, such as the intersection 614 ($A_r \cap B_r$) of the probable membership approximations 608A and 608B and the intersection 616 ($A_R \cap B_R$) of the rejected membership approximations 610A and 610B.

In one example embodiment, a new keyword 402 can be determined to be similar to the weak membership approximation, such as 606A. The membership module 206 determines that a new keyword 402 is similar to the weak membership 606A. In one example, the new keyword 402, y, has the value "incomplete func." The membership module 206 uses fuzzy similarity measures to generate a value for the new keyword 402. If the similarity measure for y is determined to be greater than an identified threshold associated with the labeled gravid fuzzy rough set 602A (i.e. similarity(subject, keyword)>threshold where the subject is the similarity measure of y and the keyword in the similarity function is the label from labeled gravid fuzzy rough set 602A), then y is one of the labels and does not need to be added to the labeled gravid fuzzy rough set 602A. If the similarity measure for y is less a 1 (i.e., similarity(subject, keyword)<1), then y is added to the probable membership approximation 608A for further review ($R{\uparrow}A_r$). The membership module 206 receives feedback from a subject matter expert 302 reviewing the membership approximation y and based on the received feedback adds the new keyword 402 to the weak membership approximation 606A. Thus, when $y \in R{\uparrow}A$ and $y \notin A \cap B$, the membership module 206 uses a fuzzy similarity measure to generate a value for y. If (similarity(subject, keyword)>threshold), then y is one of the labels of the weak membership approximation 606A and does not need to be added. If (similarity(subject, keyword) <1), then the membership module 206 adds y (i.e., new keyword 402) to the probable membership approximation 608A for review ($R{\uparrow}A_r$). In response to the feedback received from a subject matter expert 302, the membership module 206 can perform a membership action to add the y to the appropriate membership approximation, such as the weak membership approximation 606A or the rejection membership approximation 610A.

In another example embodiment, a new keyword 402 can be determined to be similar to the weak membership approximation, such as 606A and also have possible memberships to other labeled gravid fuzzy rough sets, such as 602B. In one example, the membership module 206 determines that a new keyword 402, y, has a value "undefiled." The membership module 206 uses fuzzy similarity measures to generate a value for y in relation to labeled gravid fuzzy rough set 602A. If the similarity measure for y is determined to be greater than an identified threshold associated with the labeled gravid fuzzy rough set 602A (i.e., similarity(subject, keyword)>threshold), then y is one of the labels of the labeled gravid fuzzy rough set 602A and does not need to be added. If the similarity measure for y is less a 1 (i.e., similarity(subject, keyword)<1), then y is added to the probable membership approximation 608A. If membership module 206 also determines that y is similar to the weak membership approximation 606B using fuzzy similarity measures to generate a value for y in relation to labeled gravid fuzzy rough set 602B, then the membership module 206 can add y to the intersection 614 ($A_r \cap B_r$) of the probable membership approximations 608A and 608B for review ($R{\uparrow}A_r \cap B_r$).

If the membership module 206 receives feedback from a subject matter expert 302 indicating that y should not be added to the weak membership approximation 606A, the membership module 206 adds y to the rejected membership approximation 610A. If the received feedback indicates that y should not be added to the weak membership approximation 606B, then the membership module 206 adds y to the rejected membership approximation 610B. If the received feedback indicates that y is to be rejected from both of the weak membership approximations 606A and 606B, the membership module 206 adds y to the intersection 616 ($A_R \cap B_R$) of the rejected membership approximations 610A and 610B. In some embodiments, in response to the received feedback, the membership module 206 adds y to the rejected membership approximation 610A and adds y to the weak membership approximation 606B. In some embodiments, in response to the received feedback, the membership module 206 adds y to the rejected membership approximation 610B and adds y to the weak membership approximation 606A.

Thus, the membership module 206 determines if a new keyword 402 y is found to be similar to the weak membership approximation 606A, $y \in R{\uparrow}A$ and $y \in A \cap B$. If the similarity measure determined for y is greater than an identified threshold associated with the labeled gravid fuzzy rough set 602A (i.e., similarity(subject, keyword)>threshold), then y is one of the labels of the labeled gravid fuzzy rough set 602A and does not need to be added. If the similarity measure generated for y is less than 1 (i.e., similarity(subject, keyword)<1), then y is added to the probable membership approximation 608A ($R\uparrow A_r$). If the membership module 206 determines that y is also similar to the weak membership approximation 606B, then y is added to the intersection 614 of the probable membership approximation 608A and 608B ($R\uparrow A_r \cap B_r$). In response to the feedback received from a subject matter expert 302, the membership module 206 can perform a membership action to add the y to the appropriate membership approximation. For example, the membership action can include adding y to the weak membership approximation 606A, adding y to the weak membership approximation 606B, or the adding y to the intersection 616 ($A_R \cap B_R$) of the rejected membership approximations 610A and 610B. In some examples, the membership action can include adding y to the rejected membership approximation 610A and adding y to the weak membership approximation 606B or adding y to the rejected membership approximation 610B and adding y to the weak membership approximation 606A.

In one example embodiment, the membership module 206 receives a new keyword 402 and determines that the keyword 402 is similar to the strong membership approximation 604A of a labeled gravid fuzzy rough set 602A. The new keyword 402, y, has the value "unhandled error." The membership module 206 uses fuzzy similarity measures to generate a value for the new keyword 402. If the similarity measure for y is determined to be greater than an identified threshold associated with the labeled gravid fuzzy rough set 602A (i.e., similarity(subject, keyword)>threshold), then y is added to the labeled gravid fuzzy rough set 602A as a label for the strong membership approximation 604A. If the similarity measure for y is less a 1 (i.e., similarity(subject, keyword)<1), then y is added to the probable membership approximation 608A for further review ($R\uparrow A_r$).

The membership module 206 receives feedback from a subject matter expert 302 and adds the y to the strong membership approximation 604A. Thus, when y∈R↓A, the membership module 206 uses a fuzzy similarity measure to generate a value for y. If (similarity(subject, keyword) >threshold), then y is added as a label for the labeled gravid fuzzy rough set 602A. If (similarity(subject, keyword)<1), then the membership module 206 adds y to the probable membership approximation 608A for review ($R\uparrow A_r$). In response to the feedback received from a subject matter expert 302, the membership module 206 performs a membership action to add the y to the appropriate membership approximation, such as the strong membership approximation 604A or the rejection membership approximation 610A.

Figure 7:
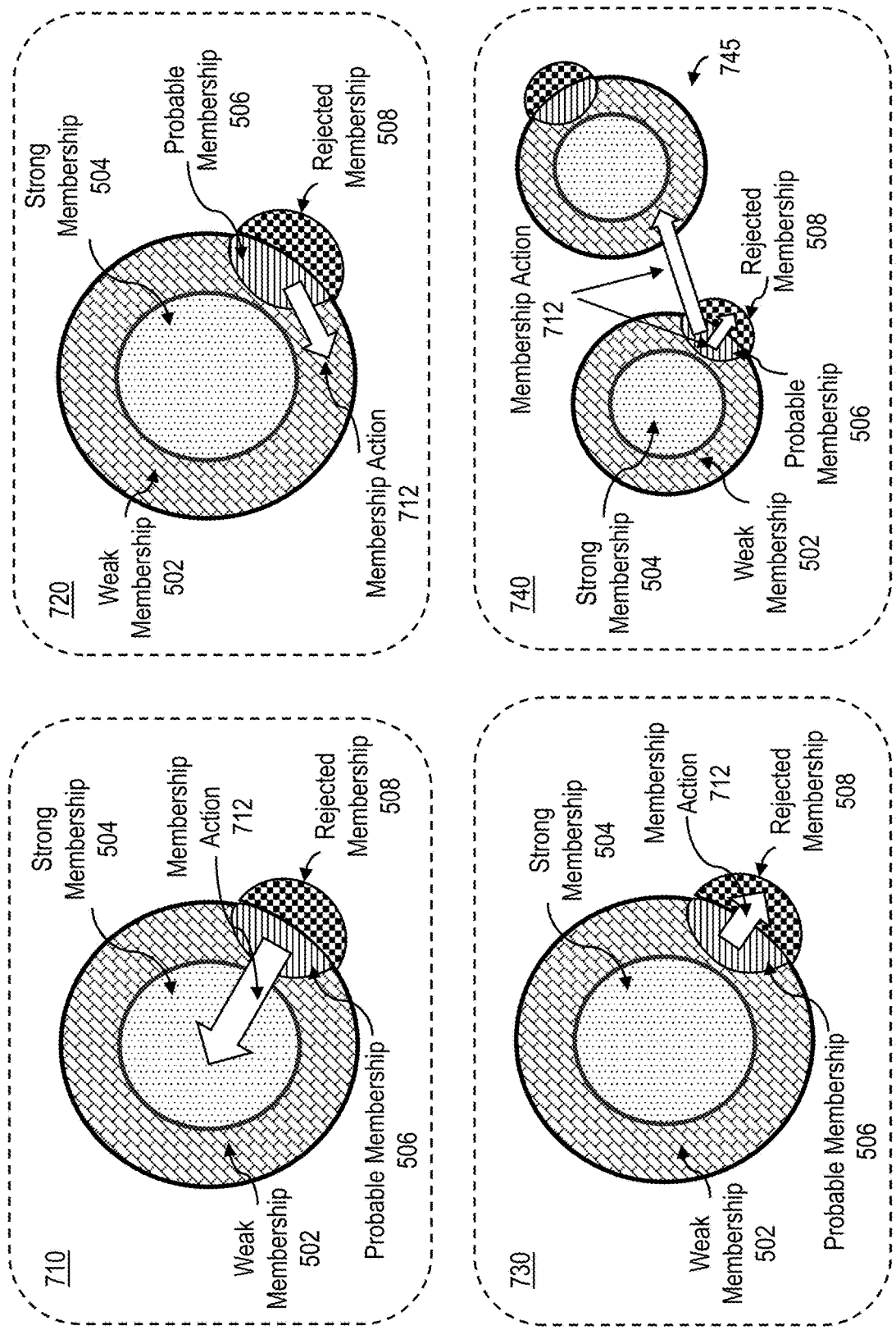
FIG. 7 is a diagram of membership actions for a new keyword for a labeled gravid fuzzy rough set in a multifaceted knowledge corpus of a system for analyzing root causes of Kubernetes pod crashes in a computing environment in accordance with one or more embodiments of the present invention.

FIG. 7 is a diagram of the different membership actions 712 for a new keyword 402 in relation to a labeled gravid fuzzy rough set 710, 720, 730, 740, 745 of a multifaceted knowledge corpus 212 of a system for analyzing root causes of Kubernetes pod crashes in a computing environment. The membership actions 712 illustrate the influence of the wisdom of a crowd such as the knowledge received through feedback from subject matter experts 302 upon membership decisions for the addition of new keywords 402 to the keyword corpus 406 of the multifaceted knowledge corpus 212. In some embodiments, the membership actions 712 for new keywords 402 in relation to the keyword corpus 406 can be finalized upon receiving feedback from a subject matter expert 302. In some embodiments, the membership actions 712 are executed upon receiving feedback from a predetermined number of subject matter experts 302. In some embodiments, the membership actions 712 are executed upon receiving feedback from identified subject matter experts 302 based on their area of expertise or specialty.

The membership action 712 depicted in relation to the labeled gravid fuzzy rough set 710 is the acceptance of a new keyword 402 that is currently classified as a member of the probable membership approximation 506 and moved into the strong membership approximation 504 of the labeled gravid fuzzy rough set 710. The labeled gravid fuzzy rough set 720 shows a membership action 712 where a new keyword 402 that is currently classified as a member of the probable membership approximation 506 is accepted and moved into the weak membership approximation 502 of the labeled gravid fuzzy rough set 720. The membership action 712 of the labeled gravid fuzzy rough set 730 shows the rejection of a new keyword 402 that is currently classified as a member of the probable membership approximation 506 and the new keyword 402 is moved to the rejected membership approximation 508 of the labeled gravid fuzzy rough set 730. Finally, the membership action 712 displayed in relation to the labeled gravid fuzzy rough set 740 is a compound action that includes rejection of the new keyword 402 that is currently classified as a member of the probable membership approximation 506 and moving the keyword 402 into the rejected membership approximation 508 of the labeled gravid fuzzy rough set 740 and accepting the new keyword 402 as a member of a different labeled gravid fuzzy rough set 745.

Figure 8:
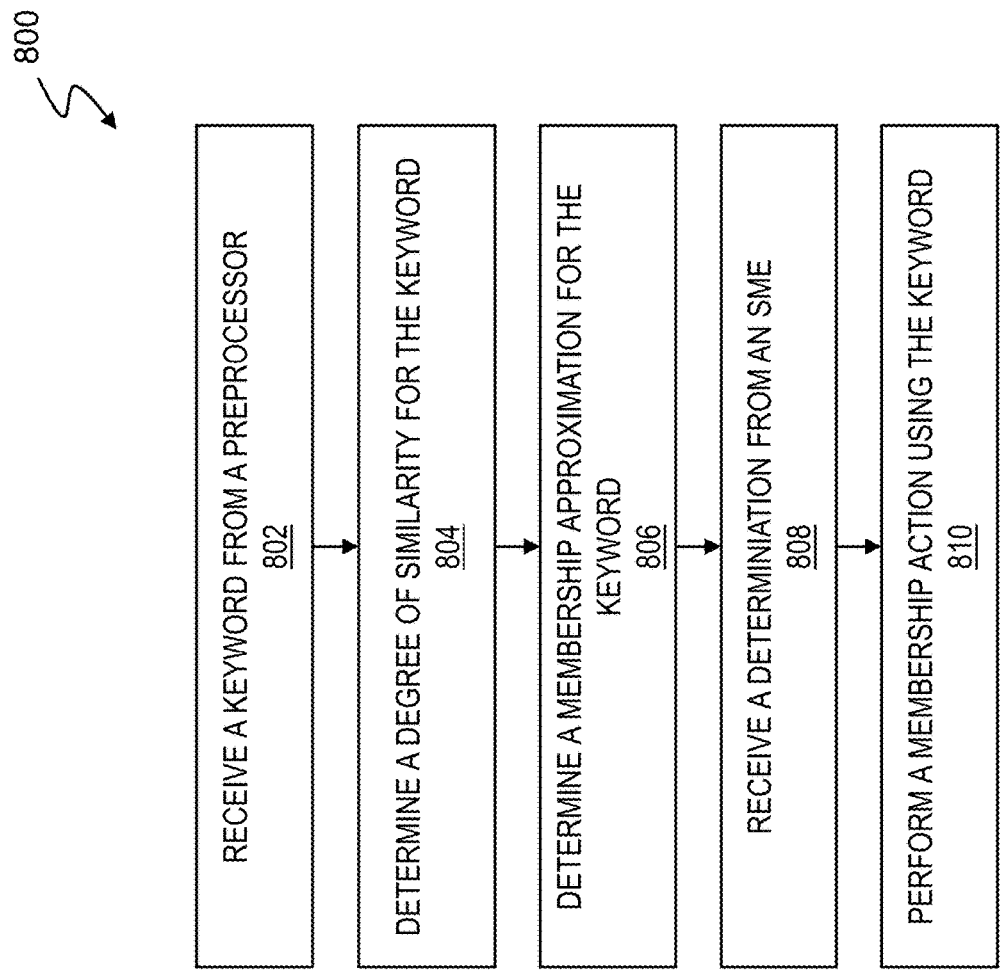
FIG. 8 is a flowchart of a computer-implemented method for adding a new keyword to a labeled gravid fuzzy rough set in a multifaceted knowledge corpus of a system for analyzing root causes of Kubernetes pod crashes in a computing environment in accordance with one or more embodiments of the present invention.

Now referring to FIG. 8, a flowchart depicts a computer-implemented method 800 for adding a new keyword 402 to a labeled gravid fuzzy rough set 500 in a multifaceted knowledge corpus 212 of a system for analyzing root causes of Kubernetes pod crashes in a computing environment. The computer-implemented method 800 is executed by the computer system 202. Reference can be made to any figures discussed herein.

At block 802 of the computer-implemented method 800, a keyword 402 is received from a preprocessor 204 of a system for analyzing root causes of Kubernetes pod crashes. The membership module 206 receives one or more keywords 402 from the preprocessor 204. In some embodiments, the preprocessor 204 preprocesses input data 210 associated with one or more Kubernetes pod crashes, which can include data cleaning, integration, and/or transformation of the input data 210. The preprocessor 204 identifies one or more keywords 402 for possible addition to the multifaceted knowledge corpus 212 from the preprocessed input data 210 using one or more known techniques for keyword extraction and error neighbor recognition. The preprocessor 204 transmits the one or more keywords 402 to the membership module 206.

At block 804, the membership module 206 determines a degree of similarity for the keyword 402. In some embodiments, the membership module 206 generates a degree of similarity for the keyword 402 for each of the labeled gravid fuzzy rough sets 500 of the keyword corpus 406. As described in relation to FIG. 6, the membership module 206 generates the degree of similarity for the keyword 402 using known fuzzy similarity measures.

At block 806, the membership module 206 determines a membership approximation for the keyword 402. In some embodiments, the membership module 206 uses the degree of similarity generated for each labeled gravid fuzzy rough set 500 of the keyword corpus 406 to determine a respective membership approximation for each labeled gravid fuzzy rough set 500, thus permitting the keyword 402 to potentially have multiple membership approximations in different labeled gravid fuzzy rough sets 500. For each labeled gravid fuzzy rough set 500, a keyword 402 can belong to the strong membership approximation 504, the weak membership approximation 502, the probable membership approximation 506, and the rejected membership approximation 508. A keyword 402 can potentially belong to different types of membership approximations in relation to the different labeled gravid fuzzy rough sets 500.

At block 808, the membership module 206 receives a determination from a subject matter expert 302. For example, the membership module 206 receives feedback from the subject matter expert 302 regarding the membership approximation determined for the keyword 402 at block 806. In some embodiments, the feedback from the subject matter expert 302 includes a confirmation of the current membership approximation associated with the keyword 402. In some embodiments, the feedback from the subject matter expert 302 includes a suggestion to modify the current membership approximation associated with the keyword 402 to a different membership approximation of the labeled gravid fuzzy rough set 500. In some embodiments, the feedback from the subject matter expert 302 includes a suggestion to include the keyword 402 in a membership approximation for a different labeled gravid fuzzy rough set 500. In some embodiments, the feedback from the subject matter expert 302 can suggest the keyword 402 be excluded from addition to the keyword corpus 406. In some embodiments, the subject matter experts provide supporting information for their feedback.

In some embodiments, the membership module 206 determines that feedback should be received from a predetermined number of subject matter experts 302 before proceeding to the next block. In some embodiments, the membership module 206 determines that feedback should be received from a subject matter expert 302 that is associated with a specific subject matter area or experience.

At block 810, the membership module 206 performs a membership action 712 using the keyword 402. In some embodiments, the membership actions 712 are executed by the membership module 206 upon receiving feedback from a predetermined number of subject matter experts 302. In some embodiments, the membership actions 712 are executed by the membership module 206 upon receiving feedback from and identified subject matter experts 302 based on their area of expertise or specialty. A membership action 712 performed by the membership module 206 in response to receiving feedback from the subject matter expert(s) 302 includes accepting the new keyword 402 as a member of the strong membership approximation 504 of the labeled gravid fuzzy rough set 500, accepting the new keyword 402 as a member of the weak membership approximation 502 of the labeled gravid fuzzy rough set 500, rejecting the addition of the keyword 402 to the labeled gravid fuzzy rough set 500, and rejecting the addition of the keyword 402 to the labeled gravid fuzzy rough set 500 and accepting the keyword 402 as a member of a different labeled gravid fuzzy rough set 500.

Figure 9:
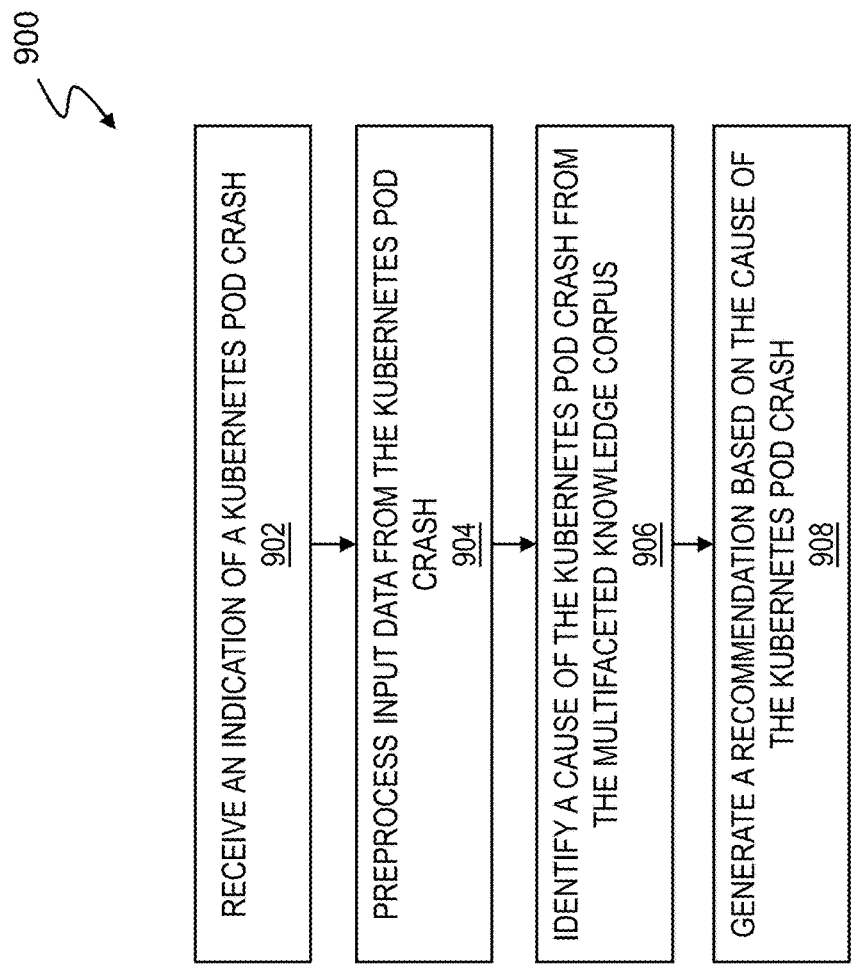
FIG. 9 is a flowchart of a computer-implemented method for identifying a root cause of a Kubernetes pod crash by a system for analyzing root causes of Kubernetes pod crashes in a computing environment in accordance with one or more embodiments of the present invention.

Now referring to FIG. 9, a flowchart depicts a computer-implemented method 900 for identifying a root cause of a Kubernetes pod crash by a system for analyzing root causes of Kubernetes pod crashes in a computing environment. The computer-implemented method 900 can be executed by the computer system 202. At block 902, an indication of a Kubernetes pod crash is received. In some embodiments, the indication is received from a monitoring agent of the system for analyzing root causes of Kubernetes pod crashes. In some embodiments, the indication is a request to initiate root cause analysis for a Kubernetes pod crash received from a subject matter expert 302 or another user of the computing environment. The indication can include information identifying the Kubernetes pod that failed and additional information associated with the pod crash, such as time of crash, identification of the node or cluster of the pod, or the like. In some embodiments, the indication includes input data 210 associated with the Kubernetes pod crash.

At block 904, the preprocessor 204 receives the input data 210 associated with a Kubernetes pod crash. As discussed above, the preprocessor 204 cleans, integrates, and/or transforms the data from the input data 210. The preprocessor 204 applies one or more known techniques for data cleaning to the text of the input data 210. The preprocessor 204 can integrate the different types of data in the input data 210, such as the logs, events, and pod details, to create a dataset for analysis. In some embodiments, the preprocessor 204 transforms the cleaned and integrated dataset into an identified format for further analysis. In some embodiments, the preprocessor 204 performs keyword extraction and error neighbor recognition to locate errors in the preprocessed dataset.

At block 906, the cause of the Kubernetes pod crash is identified from the multifaceted knowledge corpus 212. In some embodiments, the preprocessor 204 compares the keywords 402 identified during preprocessing of the input data 210 associated with the identified Kubernetes pod crash with the multifaceted knowledge corpus 212. In some embodiments, the preprocessor 204 compares the identified keywords 402 to the multifaceted knowledge corpus 212 using fuzzy logic. In some embodiments, the preprocessor 204 determines that one or more identified keywords 402 match a keyword in keyword corpus 406 of the multifaceted knowledge corpus 212. The preprocessor 204 identifies one or more labels associated with the matching keyword of the multifaceted knowledge corpus 212 and transmits them to the recommendation builder 208.

At block 908, a recommendation 304 based on the cause of the Kubernetes pod crash is generated. In some embodiments, the recommendation builder 208 receives one or more labels from the preprocessor 204. The recommendation builder 208 can score the identified labels and rank the labels to identify the most relevant labels associated with root cause associated with the matching keyword from the multifaceted knowledge corpus 212. In some embodiments, the recommendation builder 208 can apply fuzzy relevance rank measures to the identified labels to identify the most relevant labels.

The recommendation builder 208 generates a recommendation 304 based on the topmost ranked labels associated with the matching keyword from the multifaceted knowledge corpus 212. The recommendation 304 can include one or more suggestions to correct an error in the Kubernetes pod that caused the failure. In some embodiments, the suggestions can incorporate actions to correct the error that caused the pod failure. In some embodiments, the actions can include corrective steps that were previously provided by subject matter experts 302 or other users of the pod to correct similar errors. In some embodiments, the actions include examples of code or other information used in properly executing pods. The recommendation builder 208 can generate suggestions to correct the error to identify the location of the cause of the error found in the input data 210 associated with the Kubernetes pod crash and specific instructions identifying how to correct the error. The recommendation builder 208 can transmit the recommendation 304 to be displayed to one or more subject matter experts 302 or users of the system indicated as responsible or associated with the deployment and/or management of the Kubernetes pod. In response to receiving an acceptance of the suggestion, which may include the actions as corrective steps, to correct the error at the location, the computer system 202 and/or the user device 240 automatically causes the error to be corrected.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
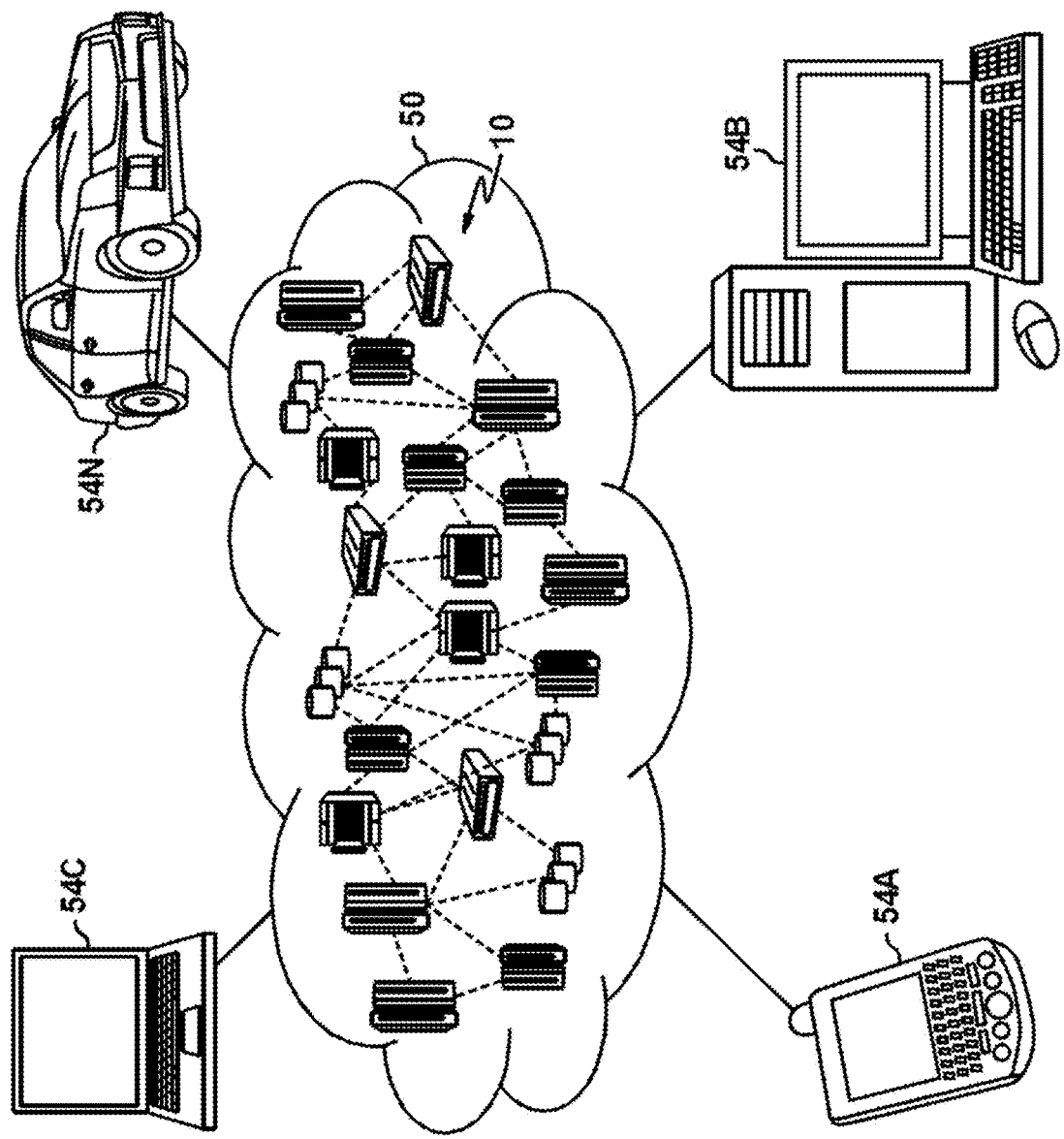
FIG. 10 depicts a cloud computing environment in accordance with one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
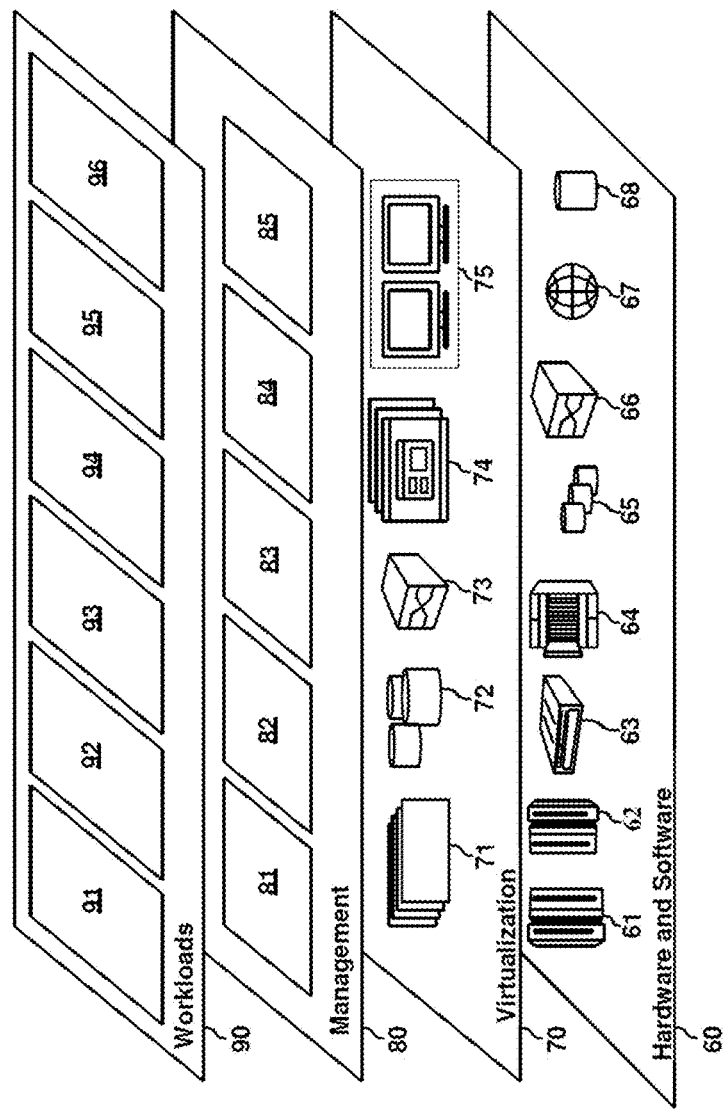
FIG. 11 depicts abstraction model layers in accordance with one or more embodiments of the present invention.

Referring now to FIG. 11, a set of functional abstraction layers provided by cloud computing environment 50 (depicted in FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a keyword from a preprocessor of a Kubernetes root cause analysis system;
   determining a degree of similarity for the keyword;
   determining a membership approximation for the keyword in a labeled gravid fuzzy rough set of a multifaceted knowledge corpus based on the degree of similarity for the keyword;
   receiving a determination associated with the membership approximation for the keyword from a subject matter expert;
   performing a membership action using the keyword on the labeled gravid fuzzy rough set;
   receiving, by the Kubernetes root cause analysis system, an indication of a new Kubernetes pod crash for a worker machine;
   generating a recommendation based on a label associated with a matching keyword in the multifaceted knowledge corpus; and
   automatically causing an error to be corrected for the new Kubernetes pod crash of the worker machine by executing code for properly running pods.

2. The computer-implemented method of claim 1, wherein:
   the membership approximation for the keyword is a probable membership approximation; and
   the membership action is moving the keyword to a strong membership approximation of the labeled gravid fuzzy rough set, moving the keyword to a weak membership approximation of the labeled gravid fuzzy rough set, or moving the keyword to a different labeled gravid fuzzy rough set of the multifaceted knowledge corpus.

3. The computer-implemented method of claim 1, further comprising:
   receiving a different keyword from the preprocessor of the Kubernetes root cause analysis system;
   determining a degree of similarity for the different keyword;
   determining a rejected membership approximation for the different keyword in the labeled gravid fuzzy rough set of the multifaceted knowledge corpus based on determining that the degree of similarity for the different keyword is below a threshold; and
   moving the different keyword to the rejected membership approximation in the labeled gravid fuzzy rough set.

4. The computer-implemented method of claim 1, wherein:
   the multifaceted knowledge corpus comprises data shelves of different data types; and
   a shelf of the multifaceted knowledge corpus comprises the labeled gravid fuzzy rough set.

5. The computer-implemented method of claim 1, further comprising:
   receiving, by the preprocessor, input data comprising logs, events, and Kubernetes pod details associated with a Kubernetes pod crash; and
   identifying, by the preprocessor, the keyword by preprocessing text of the input data and filtering the events of the Kubernetes pod crash.

6. The computer-implemented method of claim 1, further comprising:
   preprocessing new input data associated with the new Kubernetes pod crash; and
   identifying a cause of the new Kubernetes pod crash by finding the matching keyword in the multifaceted knowledge corpus with a new keyword identified from preprocessing the new input data.

7. The computer-implemented method of claim 1, wherein the recommendation comprises a suggestion to correct the error in a Kubernetes pod that caused the new Kubernetes pod crash.

8. A system comprising:
   a memory having computer readable instructions; and
   one or more processors for executing the computer readable instructions, the computer readable instructions controlling the one or more processors to perform operations comprising:
      receiving a keyword from a preprocessor of a Kubernetes root cause analysis system;
      determining a degree of similarity for the keyword;
      determining a membership approximation for the keyword in a labeled gravid fuzzy rough set of a multifaceted knowledge corpus based on the degree of similarity for the keyword;
      receiving a determination associated with the membership approximation for the keyword from a subject matter expert;
      performing a membership action using the keyword on the labeled gravid fuzzy rough set;
      receiving, by the Kubernetes root cause analysis system, an indication of a new Kubernetes pod crash for a worker machine;
      generating a recommendation based on a label associated with a matching keyword in the multifaceted knowledge corpus; and
      automatically causing an error to be corrected for the new Kubernetes pod crash of the worker machine by executing code for properly running pods.

9. The system of claim 8, wherein:
   the membership approximation for the keyword is a probable membership approximation; and
   the membership action is moving the keyword to a strong membership approximation of the labeled gravid fuzzy rough set, moving the keyword to a weak membership approximation of the labeled gravid fuzzy rough set, or moving the keyword to a different labeled gravid fuzzy rough set of the multifaceted knowledge corpus.

10. The system of claim 8, wherein the operations further comprise:
    receiving a different keyword from the preprocessor of the Kubernetes root cause analysis system;
    determining a degree of similarity for the different keyword;
    determining a rejected membership approximation for the different keyword in the labeled gravid fuzzy rough set of the multifaceted knowledge corpus based on determining that the degree of similarity for the different keyword is below a threshold; and moving the different keyword to the rejected membership approximation in the labeled gravid fuzzy rough set.

11. The system of claim 8, wherein:
the multifaceted knowledge corpus comprises data shelves of different data types; and
a shelf of the multifaceted knowledge corpus comprises the labeled gravid fuzzy rough set.

12. The system of claim 8, wherein the operations further comprise:
receiving, by the preprocessor, input data comprising logs, events, and Kubernetes pod details associated with a Kubernetes pod crash; and
identifying, by the preprocessor, the keyword by preprocessing text of the input data and filtering the events of the Kubernetes pod crash.

13. The system of claim 8, wherein the operations further comprise:
preprocessing new input data associated with the new Kubernetes pod crash; and
identifying a cause of the new Kubernetes pod crash by finding the matching keyword in the multifaceted knowledge corpus with a new keyword identified from preprocessing the new input data.

14. The system of claim 8, wherein the recommendation comprises a suggestion to correct the error in a Kubernetes pod that caused the new Kubernetes pod crash.

15. A computer program product comprising a computer readable storage medium having program instructions embodied therewith, the program instructions executable by one or more processors to cause the one or more processors to perform operations comprising:
receiving a keyword from a preprocessor of a Kubernetes root cause analysis system;
determining a degree of similarity for the keyword;
determining a membership approximation for the keyword in a labeled gravid fuzzy rough set of a multifaceted knowledge corpus based on the degree of similarity for the keyword;
receiving a determination associated with the membership approximation for the keyword from a subject matter expert;
performing a membership action using the keyword on the labeled gravid fuzzy rough set;
receiving, by the Kubernetes root cause analysis system, an indication of a new Kubernetes pod crash for a worker machine;
generating a recommendation based on a label associated with a matching keyword in the multifaceted knowledge corpus; and
automatically causing an error to be corrected for the new Kubernetes pod crash of the worker machine by executing code for properly running pods.

16. The computer program product of claim 15, wherein the membership approximation for the keyword is a probable membership approximation; and
the membership action is moving the keyword to a strong membership approximation of the labeled gravid fuzzy rough set, moving the keyword to a weak membership approximation of the labeled gravid fuzzy rough set, or moving the keyword to a different labeled gravid fuzzy rough set of the multifaceted knowledge corpus.

17. The computer program product of claim 15, wherein the operations further comprise:
receiving a different keyword from the preprocessor of the Kubernetes root cause analysis system;
determining a degree of similarity for the different keyword;
determining a rejected membership approximation for the different keyword in the labeled gravid fuzzy rough set of the multifaceted knowledge corpus based on determining that the degree of similarity for the different keyword is below a threshold; and
moving the different keyword to the rejected membership approximation in the labeled gravid fuzzy rough set.

18. The computer program product of claim 15, wherein:
the multifaceted knowledge corpus comprises data shelves of different data types; and
a shelf of the multifaceted knowledge corpus comprises the labeled gravid fuzzy rough set.

19. The computer program product of claim 15, wherein the operations further comprise:
receiving, by the preprocessor, input data comprising logs, events, and Kubernetes pod details associated with a Kubernetes pod crash; and
identifying, by the preprocessor, the keyword by preprocessing text of the input data and filtering the events of the Kubernetes pod crash.

20. The computer program product of claim 15, wherein the operations further comprise:
preprocessing new input data associated with the new Kubernetes pod crash; and
identifying a cause of the new Kubernetes pod crash by finding the matching keyword in the multifaceted knowledge corpus with a new keyword identified from preprocessing the new input data.

* * * * *